US009846090B2

(12) United States Patent
Takahashi et al.

(10) Patent No.: US 9,846,090 B2
(45) Date of Patent: Dec. 19, 2017

(54) MAGNETIC LOAD SENSOR FOR USE IN A LINEAR MOTION ACTUATOR, AND A LINEAR MOTION ACTUATOR

(75) Inventors: Toru Takahashi, Iwata (JP); Makoto Yasui, Iwata (JP); Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 380 days.

(21) Appl. No.: 14/235,106

(22) PCT Filed: Jul. 24, 2012

(86) PCT No.: PCT/JP2012/068657
§ 371 (c)(1),
(2), (4) Date: Jan. 27, 2014

(87) PCT Pub. No.: WO2013/015263
PCT Pub. Date: Jan. 31, 2013

(65) Prior Publication Data
US 2014/0191627 A1 Jul. 10, 2014

(30) Foreign Application Priority Data
Jul. 28, 2011 (JP) .................. 2011-165411

(51) Int. Cl.
*H02K 11/00* (2016.01)
*G01L 1/00* (2006.01)
(Continued)

(52) U.S. Cl.
CPC .............. *G01L 1/005* (2013.01); *B60T 13/74* (2013.01); *B60T 13/741* (2013.01); *F16D 65/18* (2013.01);
(Continued)

(58) Field of Classification Search
CPC ......... G01L 1/12; F16D 55/225; F16D 66/00; F16D 2066/005; F16D 2125/36;
(Continued)

(56) References Cited

U.S. PATENT DOCUMENTS 5,663,641 A * 9/1997 Morita .................... G01P 3/487
324/174
6,176,352 B1 * 1/2001 Maron .................. B60T 13/741
188/1.11 E
(Continued)

FOREIGN PATENT DOCUMENTS

JP 58-201041 11/1983
JP 2000-214002 8/2000
(Continued)

OTHER PUBLICATIONS

International Search Report issued Sep. 25, 2012 in International (PCT) Application No. PCT/JP2012/068657.
(Continued)

*Primary Examiner* — Joshua Benitez Rosario
*Assistant Examiner* — Leda Pham
(74) *Attorney, Agent, or Firm* — Wenderoth, Lind & Ponack, L.L.P.

(57) ABSTRACT

A magnetic load sensor unit (1) is provided which can detect the magnitude of an axial load applied by a linear motion actuator (14) to a friction pad (22). The magnetic load sensor unit (1) includes a magnetic target (4) which generates a magnetic field, and a magnetic sensor (5) designed to move relative to the magnetic target (4) corresponding to the axial load.

14 Claims, 15 Drawing Sheets

(51) Int. Cl.
 *G01L 1/12* (2006.01)
 *B60T 13/74* (2006.01)
 *F16D 65/18* (2006.01)
 *H02K 11/20* (2016.01)
 *F16D 66/00* (2006.01)
 *F16D 125/10* (2012.01)
 *F16D 125/36* (2012.01)
 *F16D 125/40* (2012.01)
 *F16D 125/48* (2012.01)

(52) U.S. Cl.
 CPC .............. *G01L 1/122* (2013.01); *H02K 11/20* (2016.01); *F16D 2066/005* (2013.01); *F16D 2125/10* (2013.01); *F16D 2125/36* (2013.01); *F16D 2125/40* (2013.01); *F16D 2125/48* (2013.01)

(58) Field of Classification Search
 CPC ............. F16D 2125/40; F16D 2125/48; F16D 2125/10; H02K 11/001; H02K 11/20
 USPC ....................................................... 310/36 D
 See application file for complete search history.

(56) References Cited

U.S. PATENT DOCUMENTS

| | | | |
|---|---|---|---|
| 2003/0125863 A1 | 7/2003 | Tamasho et al. | |
| 2004/0104618 A1* | 6/2004 | Yamamoto | B60T 7/042 303/20 |
| 2004/0187591 A1* | 9/2004 | Baumann | B60T 13/741 73/779 |
| 2005/0284238 A1 | 12/2005 | Wilkie et al. | |
| 2007/0157742 A1* | 7/2007 | Kouduki | B60B 27/00 73/862.541 |
| 2008/0106259 A1* | 5/2008 | Stuve | G01D 5/145 324/207.24 |
| 2008/0285901 A1* | 11/2008 | Koike | G01L 5/0023 384/448 |
| 2009/0120184 A1* | 5/2009 | Ozaki | B60B 27/0005 73/494 |
| 2010/0175487 A1 | 7/2010 | Sato | |

FOREIGN PATENT DOCUMENTS

| | | | |
|---|---|---|---|
| JP | 2003-014018 | 1/2003 | |
| JP | 2003-194119 | 7/2003 | |
| JP | 2003-287063 | 10/2003 | |
| JP | 2004-204990 | 7/2004 | |
| JP | 2004-301835 | 10/2004 | |
| JP | 2006-010694 | 1/2006 | |
| JP | 2007-040459 | 2/2007 | |
| JP | 2009-075083 | 4/2009 | |
| WO | WO 0101066 A1 * | 1/2001 | B60T 7/042 |

OTHER PUBLICATIONS

Written Opinion of the International Searching Authority issued Sep. 25, 2012 in International (PCT) Application No. PCT/JP2012/068657 (with English translation).

* cited by examiner

MAGNETIC LOAD SENSOR FOR USE IN A LINEAR MOTION ACTUATOR, AND A LINEAR MOTION ACTUATOR

TECHNICAL FIELD

This invention relates to a magnetic load sensor for use in a linear motion actuator, and a linear motion actuator including the magnetic load sensor.

BACKGROUND ART of today's vehicle brake systems are hydraulic brake systems including a brake disk and friction pads adapted to be pressed against the brake disk by hydraulic cylinders. But with the introduction of new brake control systems such as anti-lock brake systems (ABS), electric brake systems, which require no hydraulic circuits, are receiving attention these days.

An electric brake system typically includes a linear motion actuator which includes a rotary shaft to which the rotation of an electric motor is to be transmitted, and a linear motion mechanism for converting the rotation of the rotary shaft to axial movement of a linear motion member. By the axial movement of the linear motion member, an axial load is applied to the friction pads, so that the friction pads are pressed against the brake disk, thus generating a braking force. In order to control the braking force to a desired value, many of such linear motion actuators include a sensor for detecting the magnitude of an axial load applied to an object.

The below-identified Patent documents 1-3 disclose linear motion actuators each including a sensor for detecting the magnitude of an axial load.

The linear motion actuator disclosed in Patent document 1 is provided with a strain gauge mounted to a caliper body, which receives a reaction force when an axial force is applied to the friction pads. Based on a change in electrical resistance as measured by the strain gauge, it is possible to detect the amount of deformation of the caliper body, and to detect the magnitude of the axial load applied by the linear motion actuator based on the amount of deformation of the caliper body.

In the linear motion actuator disclosed in Patent documents 2, the linear motion member for applying an axial load to the friction pads is made of a sintered ceramic pressure-sensitive element, and a pair of electrodes are embedded in the distal end of the linear motion member. With this arrangement, the magnitude of the axial load applied by the linear motion actuator is detected by measuring a change in electrical resistance between the electrodes.

In the linear motion actuator disclosed in Patent document 3, a hydraulic pressure chamber is defined in the linear motion member for applying an axial load to the friction pads, and a piston is inserted in the hydraulic pressure chamber such that the axial load applied by the actuator is transmitted to the hydraulic pressure chamber. The magnitude of the axial load applied by the linear motion actuator is detected based on the pressure in the hydraulic pressure chamber as measured by a hydraulic pressure sensor.

PRIOR ART DOCUMENTS

Patent Documents

Patent document 1: JP Patent Publication 2003-287063A
Patent document 2: JP Patent Publication 2003-014018A
Patent document 3: JP Patent Publication 2004-204990A

SUMMARY OF THE INVENTION

Object of the Invention

In the arrangement of Patent document 1, in which the axial load is detected by the strain gauge mounted to the caliper body, the gauge picks up not the deformation of the caliper body but local strain of the caliper body, so that the reading of the gauge tends to be influenced by the temperature of the caliper body as well as by the temperature distribution over the caliper body, thus deteriorating detection accuracy.

In the arrangement of Patent document 2 too, in which the two electrodes embedded in the distal end of the linear motion member detects the axial load, the electrodes pick up not the deformation of the linear motion member but local strain of the linear motion member, so that the reading of the electrodes tends to be influenced by the temperature of the linear motion member as well as by the temperature distribution over the linear motion member, thus deteriorating detection accuracy.

In the arrangement of Patent document 3, in which the axial load applied by the linear motion actuator is detected by measuring the pressure in the hydraulic pressure chamber defined in the linear motion member, if hydraulic fluid in the hydraulic pressure chamber leaks, the axial load is not reflected in the output of the hydraulic pressure sensor. This arrangement therefore has a problem regarding long-term reliability. In order to maintain liquid tightness of this hydraulic pressure chamber with high reliability, an additional cost is necessary.

An object of the present invention is to provide a magnetic load sensor unit which can detect the magnitude of an axial load applied by the linear motion actuator with high accuracy.

Means for Achieving the Object

In order to achieve this object, the present invention provides a magnetic load sensor unit for use in a linear motion actuator, the magnetic load sensor unit being configured to detect the magnitude of an axial load applied to an object by the linear motion actuator, and comprising a magnetic target which generates a magnetic field, and a magnetic sensor configured such that the position of the magnetic sensor relative to the magnetic target changes corresponding to the axial load.

With this arrangement, since the relative position between the magnetic target and the magnetic sensor changes corresponding to the axial load applied to the object by the linear motion actuator, and the output signal of the magnetic sensor changes corresponding to the change in relative position between the magnetic target and the magnetic sensor, it is possible to detect the magnitude of the axial load based on the output signal of the magnetic sensor. With this arrangement, since the magnetic sensor detects the axial load based not on local strain but on the deformation, of the member which is deflected under the axial load, the reading of the magnetic sensor is less likely to be influenced by the temperature and temperature distribution, which in turn makes it possible to detect the magnitude of the axial load applied by the linear motion actuator with high accuracy.

The magnetic load sensor unit may include a flange member configured to be deflected when the axial load is applied, and a support member supporting the radially inner portion or the radially outer portion of the flange member, with the magnetic target fixed to one of the flange member and the support member, and the magnetic sensor fixed to the other of the flange member and the support member. With this arrangement, when an axial load is applied from the linear motion actuator to the flange member, the flange member is deflected and the relative position between the magnetic target and the magnetic sensor changes corresponding to the axial load.

Preferably, the magnetic target comprises at least two permanent magnets each magnetized in a direction perpendicular to the relative movement direction in which the position of the magnetic sensor relative to the magnetic target changes, wherein the permanent magnets are arranged such that opposite magnetic poles of the permanent magnets are aligned in the relative movement direction, and wherein the magnetic sensor is located in the vicinity of the boundary between the opposite magnetic poles.

With this arrangement, the output signal of the magnetic sensor changes sharply and steeply when the magnetic target and the magnetic sensor move relative to each other in the axial direction, but scarcely changes when the magnetic target and the magnetic sensor move relative to each other in a direction other than the axial direction. Thus, the output signal of the magnetic sensor is less likely to be influenced by external vibrations, so that it is possible to stably and accurately detect the magnitude of the axial load applied by the linear motion actuator.

Preferably, the flange member and the support member are annular plate members, with one of the flange member and the support member including a tubular portion having a radially outer surface facing a radially inner surface of the other of the flange member and the support member, and the magnetic target and the magnetic sensor are fixed to one and the other of the flange member and the support member, respectively. With this arrangement, the magnetic target and the magnetic sensor can be easily and accurately fixed in predetermined positions.

Preferably, positioning means are provided at respective outer peripheral portions of the flange member and the support member, for determining a circumferential relative position between the flange member and the support member. With this arrangement, the circumferential relative position between the magnetic target and the magnetic sensor can be easily and accurately determined.

The magnetic sensor may be a magnetic resistance element or a magnetic impedance element. But a Hall IC is preferable because it is less expensive. Also, since heat-resistant Hall ICs are commercially available, one of them can be advantageously used in the electric brake system of the present invention.

The present invention also provides a linear motion actuator comprising a rotary shaft to which the rotation of an electric motor is to be transmitted, a linear motion member, a linear motion mechanism for converting the rotation of the rotary member to axial movement of the linear motion member, thereby applying an axial load to an object, and a reaction force receiving member which receives the reaction force that acts on the linear motion mechanism when the axial load is applied to the object, wherein the reaction force receiving member is the above-described magnetic load sensor unit. The magnetic load sensor unit may be mounted between the linear motion member and the object instead.

By performing feedback of the axial load based on the output signal of the magnetic sensor, it is possible to control the axial load with high accuracy.

Advantages of the Invention

Since the magnetic load sensor unit, for use in a linear motion actuator according to the present invention detects the axial load not based on local strain but on the deformation, of the member deflected under the axial load, the axial load thus detected is less likely to be influenced by a change in temperature or a variation in temperature distribution, of the linear motion actuator, so that it is possible to detect the magnitude of the axial load of the linear motion actuator with high accuracy.

BEST MODE FOR EMBODYING THE INVENTION

Figure 1:
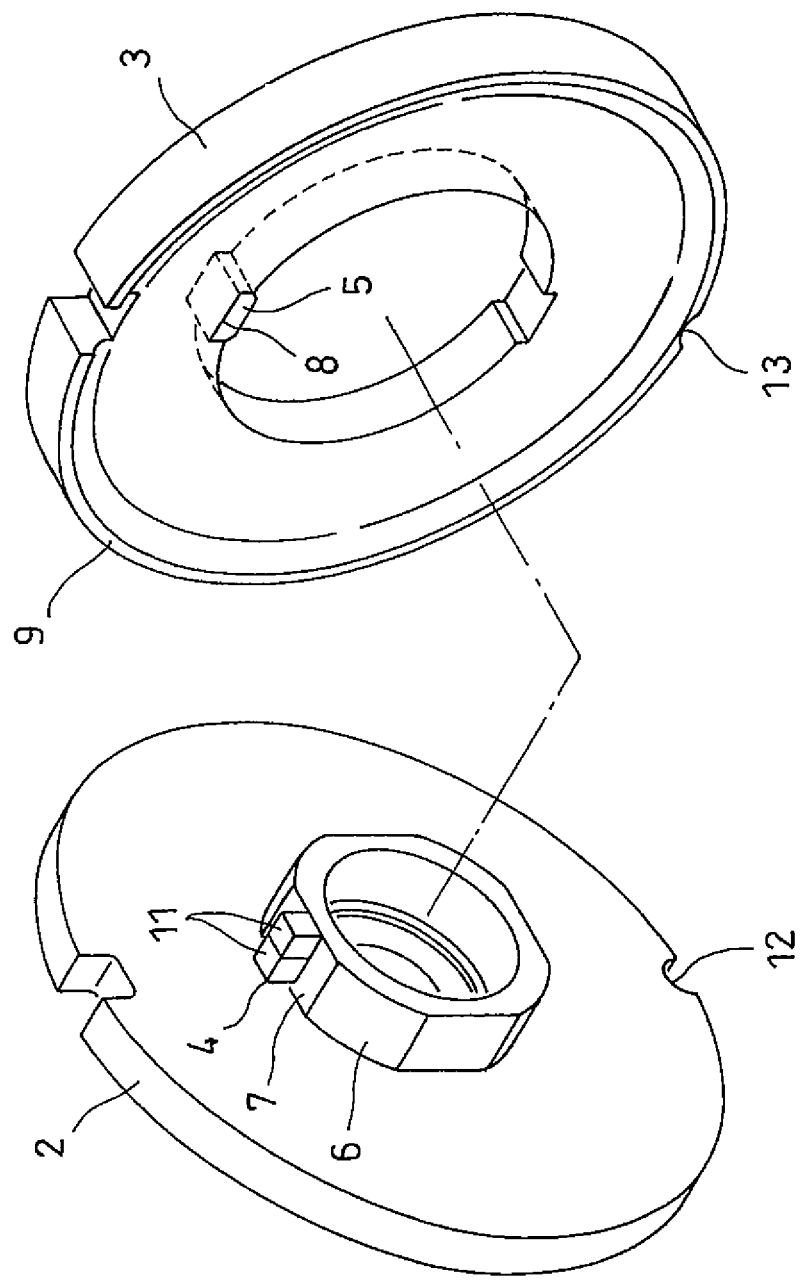
FIG. 1 is an exploded perspective view of a magnetic load sensor unit embodying the present invention.
Figure 2:
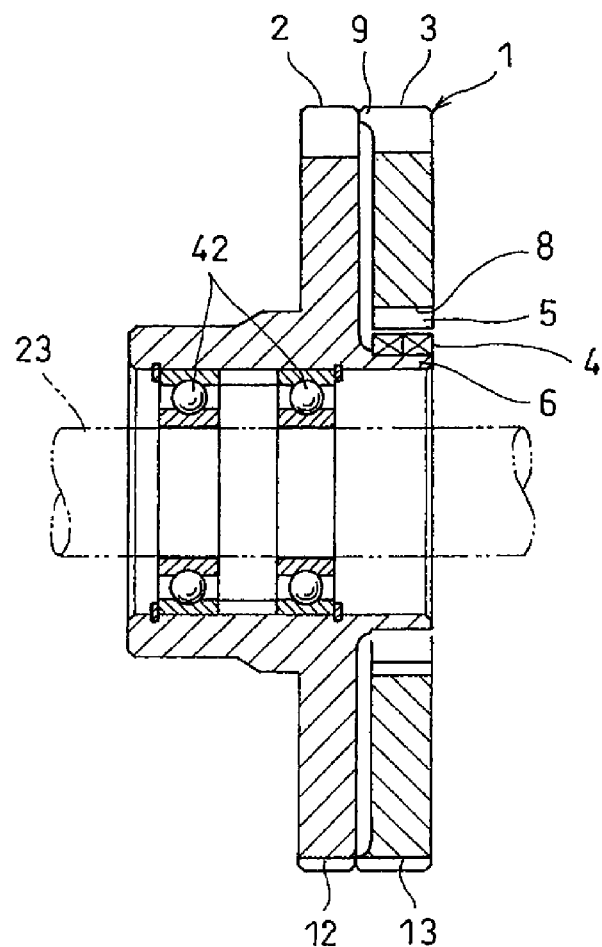
FIG. 2 is a sectional view of the magnetic load sensor unit of FIG. 1.
Figure 3:
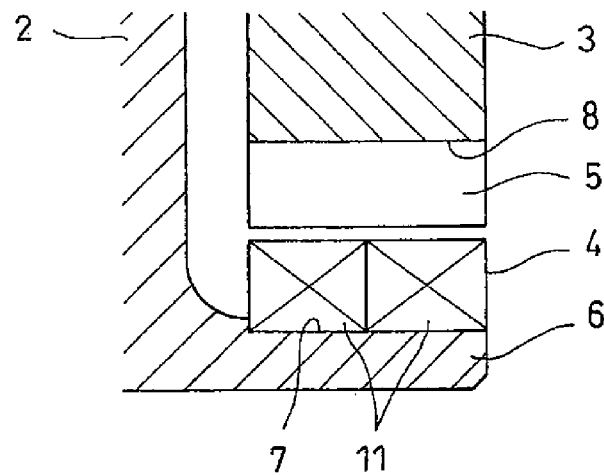
FIG. 3 is an enlarged sectional view of a portion of the sensor unit where there are a magnetic target and a magnetic sensor of FIG. 2.
Figure 4:
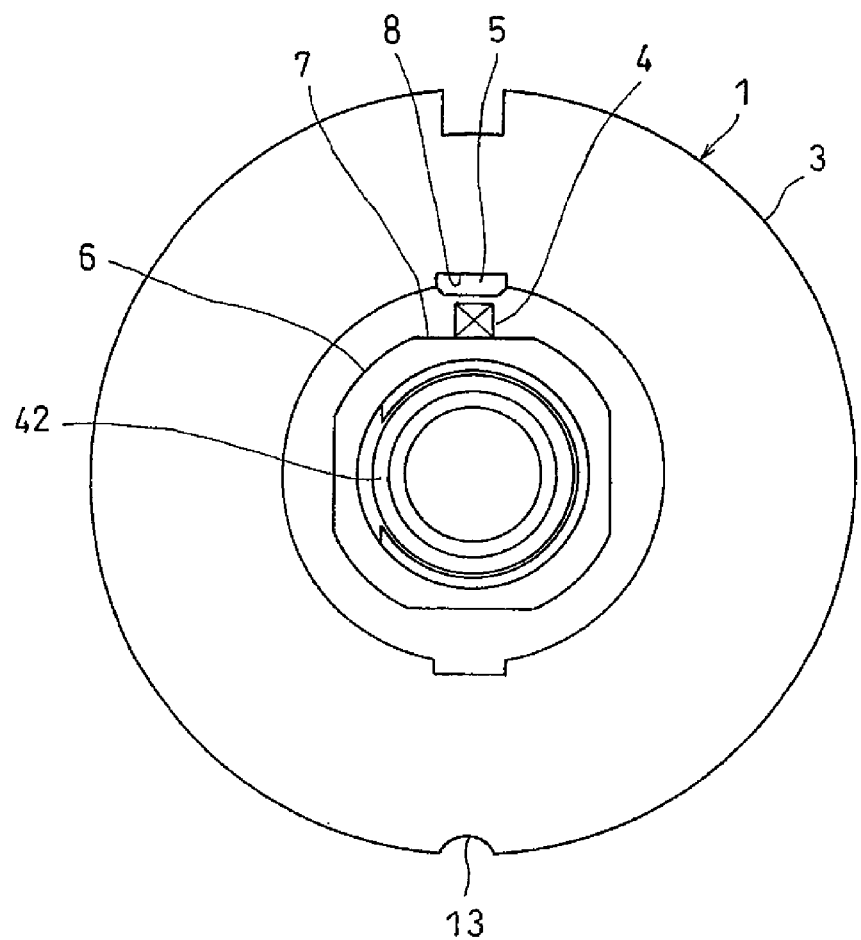
FIG. 4 is a side view of FIG. 2.

FIGS. 1 to 4 show a magnetic load sensor unit 1 for use in a linear motion actuator embodying the present invention. The magnetic load sensor unit 1 includes axially spaced apart and axially opposed flange member 2 and support member 3 which are both annular plate members, a magnetic target 4 which generates a magnetic field, and a magnetic sensor 5 for detecting the magnitude of magnetic fields.

The flange member 2 has a tubular portion 6 protruding toward the support member 3. The tubular portion 6 has a radially outer surface radially facing the radially inner surface of the support member 3. The magnetic target 4 is fixed to a chamfer 7 formed on the radially outer surface of the tubular portion 6. The magnetic sensor 5 is fixed in position in a groove 8 formed in the radially inner surface of the support member 3. The flange member 2 and the support member 3 are made of a metal such as iron.

The support member 3 has an annular protrusion 9 on its surface facing the flange member 2. The annular protrusion 9 supports the radially outer portion of the flange member 2, thereby keeping the flange member 2 spaced apart from the body of the support member 3.

The magnetic target 4 comprises two permanent magnets 11 which are radially magnetized such that each magnet 11 has two poles at its radially inner and outer ends, respectively. The two permanent magnets 11 are arranged so that the two magnetic poles (i.e. N and S poles) of one of the magnets 11 are axially aligned with the respective poles of the other magnet 11 that are opposite in polarity.

If neodymium magnets are used as the permanent magnets 11, the magnets 11 can generate strong magnetic fields while taking up little space. But as the permanent magnets 11, samarium-cobalt magnets, Alnico magnets, or ferrite magnets may be used instead. If samarium-cobalt magnets or Alnico magnets are used as the permanent magnets 11, the magnetic fields generated from the permanent magnets are less likely to decrease with a temperature rise of the permanent magnets 11. As the permanent magnets 11, praseodymium magnets or samarium-iron-nitride magnets may also be used.

The magnetic sensor 5 is arranged to face the magnetic target 4 in a direction perpendicular to the axial direction (radial direction in the figures), in the vicinity of the boundary between the adjacent magnetic poles of the two respective permanent magnets 11. As the magnetic sensor 5, a magnetic resistance element (or MR sensor) or a magnetic impedance element (or MI sensor) may be used. But a Hall IC is preferably used, because it is less expensive, and also because highly heat-resistant Hall ICs are now commercially available, and such heat-resistant Hall ICs can be advantageously used in electric brake systems.

Positioning grooves 12 and 13 are formed in the outer peripheries of the flange member 2 and the support member 3, respectively, at such positions that when a key member 45 (shown in FIG. 7) is inserted into both grooves 12 and 13, the flange member 2 and the support member 3 are circumferentially positioned relative to each other such that the circumferential position of the magnetic target 4 coincides with that of the magnetic sensor 5.

When an axial load is applied to the flange member 2 of this magnetic load sensor unit 1 that tends to push the flange member 2 toward the support member 3, the flange member 2 is deflected in the axial direction about the outer peripheral portion of the flange member 2, corresponding to the axial load. The deflection of the flange member 2 changes the relative position between the magnetic target 4 and the magnetic sensor 5, which in turn changes the output signal of the magnetic sensor 5. Thus, by grasping the relationship between the magnitude of the axial load applied to the flange member 2 and the output signal of the magnetic sensor 5 beforehand, it is possible to detect the magnitude of the axial load applied to the flange member 2 based on the output signal of the magnetic sensor 5.

Figure 5:
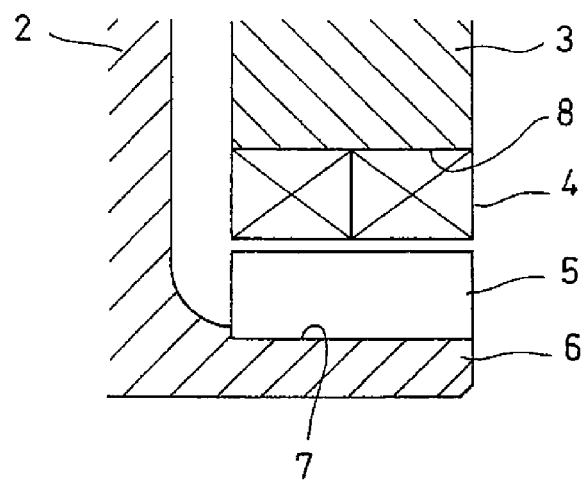
FIG. 5 is an enlarged sectional view of the same portion as FIG. 3, of a sensor unit of which the magnetic target and the magnetic sensor of FIG. 3 are arranged in a different manner from FIG. 3.

In FIGS. 1 to 4, the magnetic target 4 is fixed to the flange member 2, while the magnetic sensor 5 is fixed to the support member 3. But the magnetic target 4 and the magnetic sensor 5 may be arranged conversely. In particular, as shown in FIG. 5, the magnetic sensor 5 may be fixed to the radially outer surface of the tubular portion 6 of the flange member 2, while the magnetic target 4 may be fixed to the radially inner surface of the support member 3.

FIGS. 6 to 9 show an electric brake system including a linear motion actuator 14 in which the above-described magnetic load sensor unit 1 is mounted.

The electric brake system includes a brake disk 15 configured to rotate together with a wheel, a caliper body 19 having opposed pieces 16 and 17 facing each other with the brake disk 15 disposed therebetween and coupled together by a bridge 18, and a pair of right and left friction pads 21 and 22. The linear motion actuator 14 is mounted in a mounting hole 20 open to the surface of the opposed piece 17 facing the brake disk 15.

The friction pad 22 is provided between the opposed piece 17 and the brake disk 15, and is supported by a pad pin (not shown) mounted to the caliper body 19 so as to be movable in the axial direction of the brake disk 15. The other friction pad 21 is mounted to the other opposed piece 16. The caliper body 19 is slidable in the axial direction of the brake disk 15.

Figure 7:
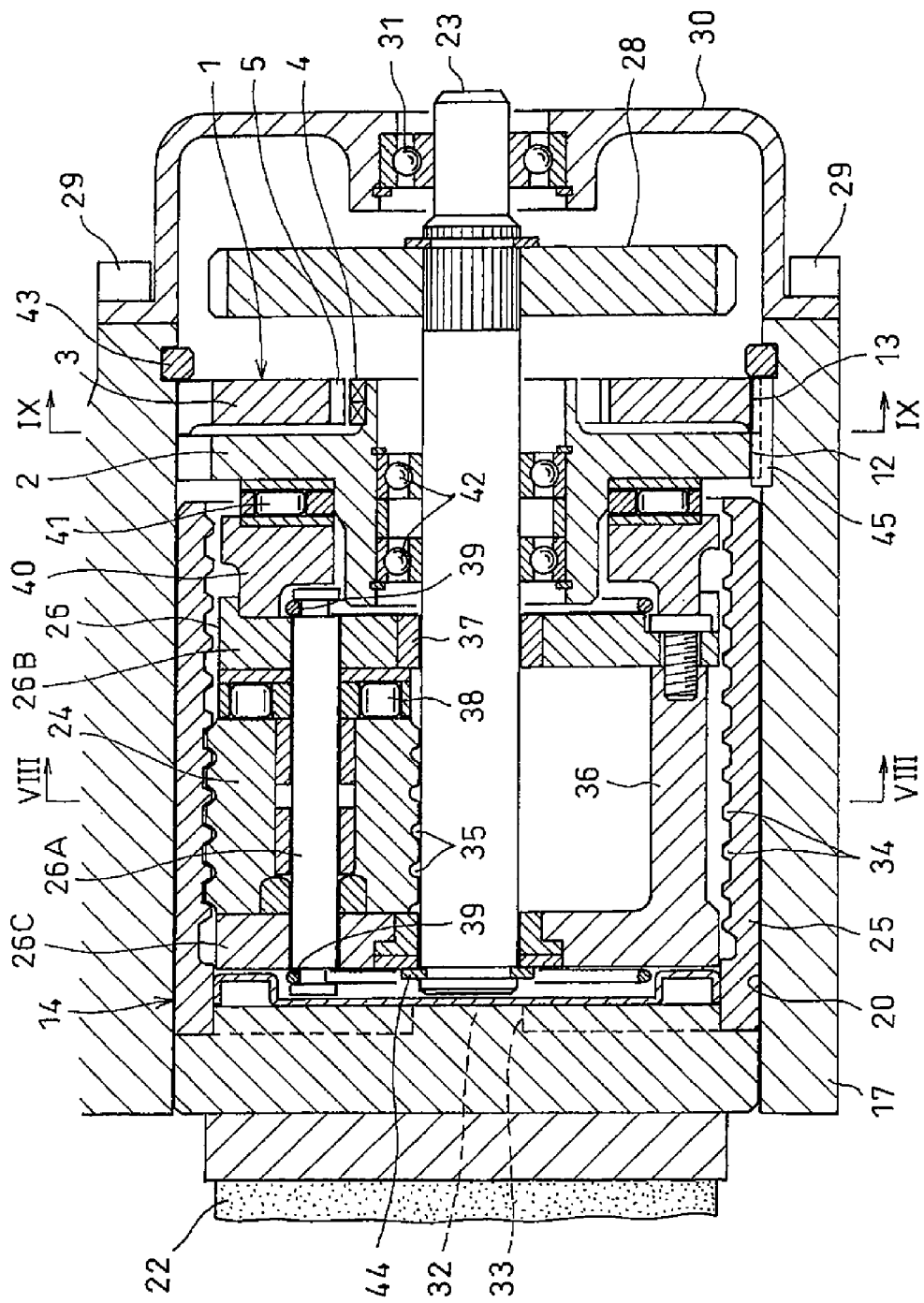
FIG. 7 is an enlarged view of a portion of FIG. 6 where there is the linear motion actuator.

As shown in FIG. 7, the linear motion actuator 14 includes a rotary shaft 23, a plurality of planetary rollers 24 kept in rolling contact with the cylindrical surface on the outer periphery of the rotary shaft 23, an outer ring member 25 surrounding the planetary rollers 24, and a carrier 26 supporting the planetary rollers 24 so as to be rotatable about their respective axes while revolving around the rotary shaft 23. The magnetic load sensor unit 1 is disposed axially rearwardly of the outer ring member 25.

Figure 6:
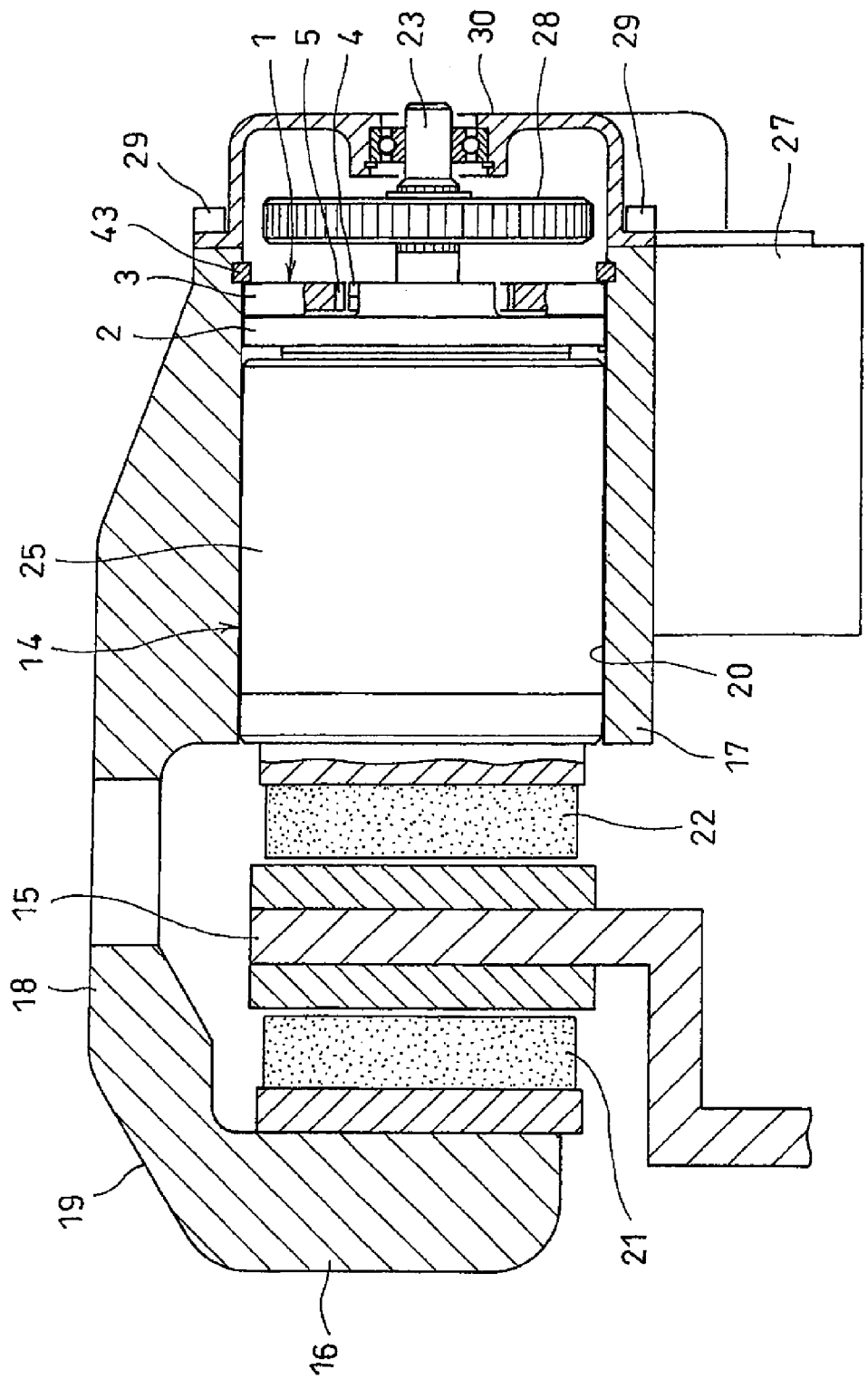
FIG. 6 is a sectional view of an electric brake system including a linear motion actuator, showing how the magnetic load sensor unit of FIG. 1 is mounted in the linear motion actuator.

The rotary shaft 23 is rotated by an electric motor 27 shown in FIG. 6 through a gear 28. The rotary shaft 23 is received in the mounting hole 20, which axially extends through the opposed piece 17, with one end of the rotary shaft 23 protruding from the opening of the mounting hole 20 at the axially rear end of the mounting hole 20. The gear 28 is rotationally fixed to this protruding end of the rotary shaft 23 by means of splines. The gear 28 is covered by a lid 30 fixed in position by bolts 29 to close the opening of the mounting hole 20 at its axially rear end. A bearing 31 is mounted in the lid 30 which rotatably supports the rotary shaft 23.

Figure 8:
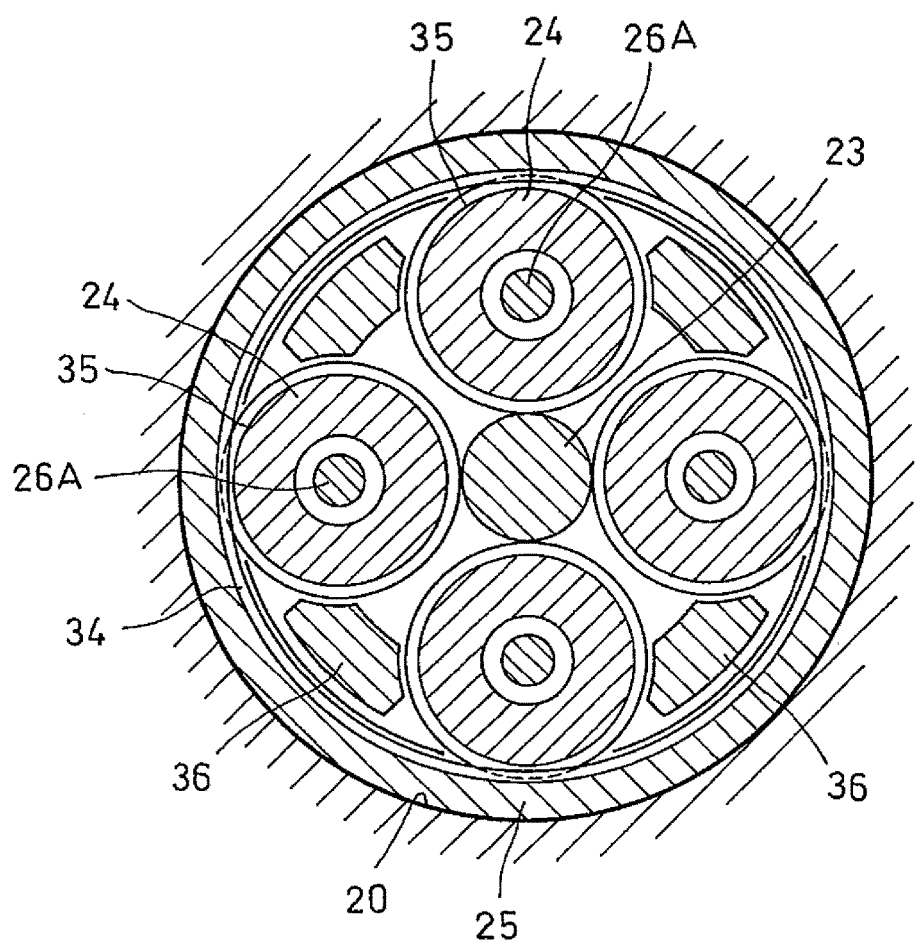
FIG. 8 is a sectional view taken along line VIII-VIII of FIG. 7.
Figure 9:
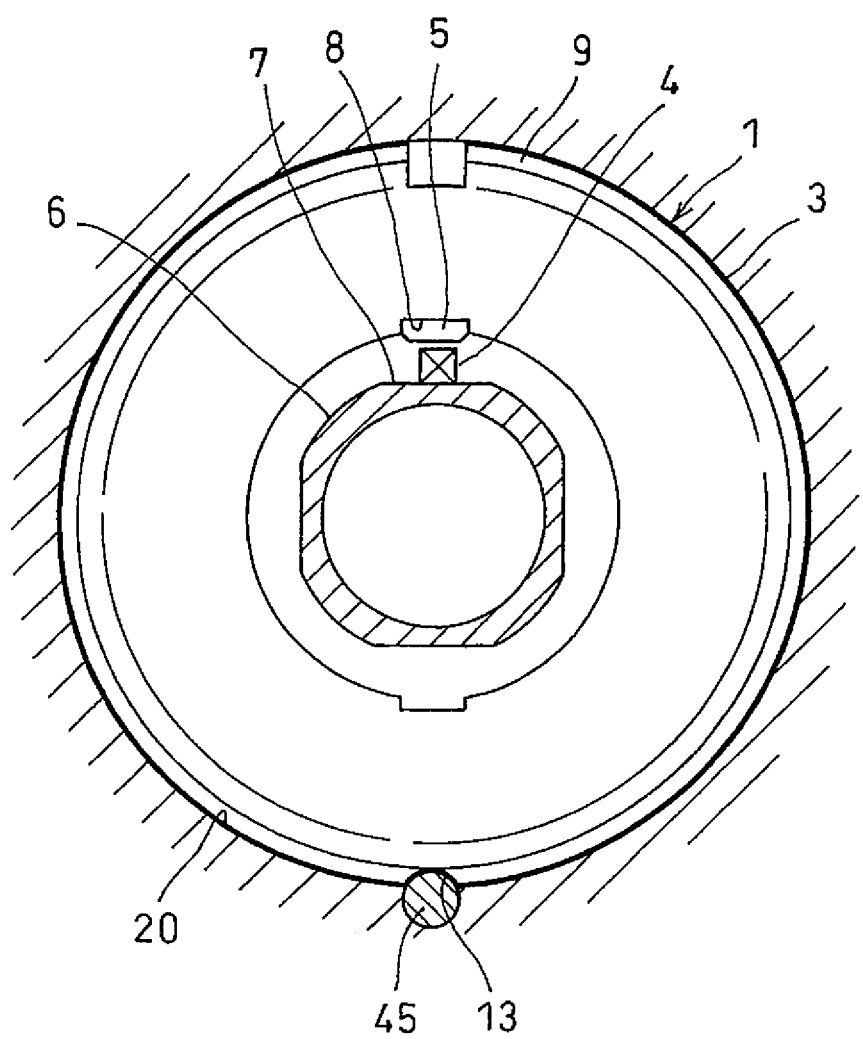
FIG. 9 is a sectional view taken along line IX-IX of FIG. 7.

As shown in FIG. 8, the planetary rollers 24 are kept in rolling contact with the cylindrical surface on the outer periphery of the rotary shaft 23 such that when the rotary shaft 23 rotates, the planetary rollers 24 also rotate due to friction between the planetary rollers 24 and the rotary shaft 23. The planetary rollers 24 are circumferentially space apart from each other.

As shown in FIG. 7, the outer ring member 25 is mounted in the mounting hole 20 formed in the opposed piece 17 of the carrier body 19, and is supported by the inner wall of the mounting hole 20 so as to be slidable in the axial direction. The outer ring member 25 has in its axial front end an engaging recess 33 in which an engaging protrusion 32 formed on the back surface of the friction pad 22 is engaged. Due to the engagement of the engaging protrusion 32 in the engaging recess 33, the outer ring member 25 is prevented from rotating relative to the caliper body 19.

A helical rib 34 is formed on the inner periphery of the outer ring member 25, while the planetary rollers 24 are each formed with circumferential grooves 35 on the outer periphery thereof in which the helical rib 34 is engageable. Thus, when the planetary rollers 24 rotate, the outer ring member 25 is moved in the axial direction, with the helical rib 34 guided by the circumferential grooves 35. Instead of the circumferential grooves 35, of which the lead angle is zero, a helical groove having a different lead angle from the helical rib 34 may be formed on the outer periphery of each planetary roller 24.

The carrier 26 includes carrier pins 26A rotatably supporting the respective planetary rollers 24, an annular carrier plate 26C keeping the axial front ends of the carrier pins 26A circumferentially equidistantly spaced apart from each other, and an annular carrier body 26B keeping the axial rear ends of the carrier pins 26A circumferentially equidistantly spaced apart from each other. The carrier plate 26C and the carrier body 26B axially face each other with the planetary rollers 24 therebetween, and are coupled together through coupling rods 36 extending between the respective circumferentially adjacent pairs of planetary rollers 24.

The carrier body 26B is supported by the rotary shaft 23 through a slide bearing 37 so as to be rotatable relative to the rotary shaft 23. Thrust bearings 38 are mounted between the respective planetary rollers 24 and the carrier body 26B to prevent transmission of rotation of the respective planetary rollers 24 about their axes to the carrier body 26B.

Radially shrinkable ring springs 39 are wrapped around the circumferentially spaced apart carrier pins 26A, biasing the carrier pins 26A radially inwardly carrier. The outer peripheries of the planetary rollers 24 are thus pressed against the outer periphery of the rotary shaft 23 under the biasing force of the radially shrinkable ring springs 39, thus preventing slippage between the rotary shaft 23 and the respective planetary rollers 24. In order to distribute the biasing force of the radially shrinkable ring springs 39 over the entire axial lengths of the respective planetary rollers 24, the radially shrinkable ring springs 39 are wrapped around, respectively, the front ends and the rear ends of the carrier pins 26A.

The magnetic load sensor unit 1 is fitted in the mounting hole 20 with the support member 3 positioned axially rearwardly of the flange member 2. Between the carrier 26 and the magnetic load sensor unit 1, there are provided a spacer 40 rotatable together with the carrier 26, and a thrust bearing 41 which is disposed between the spacer 40 and the magnetic load sensor unit 1 and through which axial loads are transmitted. Rolling bearings 42 are fitted in the flange member 2 and rotatably support the rotary shaft 23.

A snap ring 43 is fitted in the inner wall of the mounting hole 20, and engages the radially outer edge of the support member 3, preventing axial rearward movement of the magnetic load sensor unit 1. The magnetic load sensor unit 1 supports the carrier body 26B through the spacer 40 and the thrust bearing 41, thereby preventing axial rearward movement of the carrier 26. A snap ring 44 is fitted on the rotary shaft 23 at its axial front end to prevent axial forward movement of the carrier 26. As a result, the carrier 26 is prevented from both axially forward and axially rearward movements, so that the planetary rollers 24, held in position by the carrier 26, are also prevented from axial movement.

The key member 45 is in engagement with the inner wall of the mounting hole 20, and fitted in the positioning grooves 12 and 13 of the flange member 2 and the support member 3, thereby circumferentially positioning the flange member 2 and the support member 3 relative to each other.

The operation of the linear motion actuator 14 is now described.

When the electric motor 27 is energized, and the rotary shaft 23 is rotated by the motor 27, the planetary rollers 24 revolve around the rotary shaft 23 while rotating about the respective carrier pins 26A. This causes relative movement between the outer ring member 25 and the planetary rollers 24 due to engagement of the helical rib 34 in the circumferential grooves 35. But since the planetary rollers 24, as well as the carrier 26, are prevented from axial movement, only the outer ring member 25 is actually moved in the axial direction with the planetary rollers 24 kept stationary in the axial direction. Thus, the linear motion actuator 14 is effective to covert the rotation of the rotary shaft 23, when driven by the electric motor 27, to the axial movement of the outer ring member 25, thereby applying an axial load to the friction pad 22 from the outer ring member 25. Under this axial load, the friction pad 22 is pressed against the brake disk 15e, generating a braking force.

When an axial load is applied to the friction pad 22 from the outer ring member 25, an axially rearward reaction force acts on the outer ring member 25. This reaction force is transmitted through the planetary rollers 24, carrier 26, spacer 40 and thrust bearing 41, and received by the magnetic load sensor unit 1. The reaction force thus deflects the flange member 2 of the magnetic load sensor unit 1 axially rearward, changing the relative position between the magnetic target 4 and the magnetic sensor 5. This in turn changes the output signal of the magnetic sensor 5. Thus, it is possible to detect the magnitude of the axial load based on the output signal of the magnetic sensor 5. By performing feedback control of the braking force generated by this electric brake system based on the output signal of the magnetic sensor 5, it is possible to control the load with high accuracy.

The magnetic load sensor unit 1 detects the axial load not based on local strain of the flange member 2 but based on the amount of deformation of the flange member 2. The axial load thus detected is therefore less likely to be influenced by a change in temperature or a variation in temperature distribution, of the linear motion actuator, so that it is possible to detect the magnitude of the axial load of the linear motion actuator 14 with high accuracy.

When an axial load is applied to the friction pad 22, mainly shear loads act on the flange member 2, while mainly compressive loads act on the support member 3. The magnetic target 4 is displaced by the shear loads that act on the flange member 2, while the magnetic sensor 5 scarcely moves under the compressive loads that act on the support member 3. This makes it possible to detect the axial load based on the relative displacement between the magnetic target 4 and the magnetic sensor 5.

When an axial load is applied to the friction pad 22 by the linear motion actuator 14, the distance by which the relative position between the magnetic target 4 and the magnetic sensor 5 changes is extremely small. For example, if an axial load of 30 kN is applied to the friction pad by the linear motion actuator 14, the relative position between the magnetic target 4 and the magnetic sensor 5 changes only about 0.1 mm in the axial direction. But in this magnetic load sensor unit 1, since the plurality of permanent magnets 11 are arranged such that their opposite magnetic poles are aligned in the direction in which the relative position between the magnetic target 4 and the magnetic sensor 5 changes, and further the magnetic sensor 5 is positioned adjacent to the boundary between the adjacent opposite magnetic poles, the output signal of the magnetic sensor 5 changes sharply and steeply when the relative position between the magnetic target 4 and the magnetic sensor 5 changes. This makes it possible to detect the distance by which the relative position between the magnetic target 4 and the magnet sensor 5 changes with high accuracy.

If a gap sensor which detects a change in reluctance of a single coil is used instead of the magnetic target 4 and the magnetic sensor 5, due to its insufficient resolution, this sensor cannot detect the degree of deflection of the flange member 2 with high accuracy. It is therefore conceivable to use, instead of the above-described flange member 2, a less rigid member (i.e. a member which can be deformed to a greater degree under the same load). But such a member is less durable and also slower in response. To avoid this problem, a complicated mechanism for increasing displacement is necessary. Such a mechanism could cause hysteresis errors and pushes up the manufacturing cost. In contrast, since the magnetic load sensor unit 1 according to the present invention is designed such that the output signal of the magnetic sensor 5 changes sharply and steeply when the relative position between the magnetic target 4 and the magnetic sensor 5 changes, it is possible to detect the distance by which the relative position between the magnetic target 4 and the magnetic sensor 5 changes with high accuracy.

If a capacitance sensor is used instead of the magnetic target 4 and the magnetic sensor 5, a complicated damp-proof structure is necessary in order to cope with high-temperature or low-temperature conditions, which also pushes up the manufacturing cost. This sensor also requires a complicated insulation structure and a sensor driving circuit, or a low-pass filter having a low cutoff frequency, in order to remove electrical noise from the electric motor 27. Such additional components further push up the manufacturing cost, and also could slow down the driving speed of the linear motion actuator 14. In contrast, the magnetic load sensor unit 1 needs neither a complicated damp-proof structure nor a complicated insulation structure for removing electrical noise.

It is further conceivable, instead of using the magnetic target 4 and the magnetic sensor 5, to provide a hydraulic pressure chamber of which the pressure changes according to the axial load applied, and a hydraulic pressure sensor for measuring the pressure in the hydraulic pressure chamber. With this arrangement, if hydraulic fluid in the hydraulic pressure chamber leaks, the axial load is not reflected in the output of the hydraulic pressure sensor. This arrangement therefore has a problem regarding long-term reliability. In order to maintain liquid tightness of this hydraulic pressure chamber with high reliability, an expensive seal structure has to be used which can cope with fluctuations in temperature. A complicated structure is necessary to accurately measure the temperature of the hydraulic fluid too. In contrast, the magnetic load sensor unit 1 can be used reliably for a long period of time without the need for an expensive seal structure.

If a laser displacement sensor is used instead of the magnetic target 4 and the magnetic sensor 5, a complicated seal structure is necessary for oil and fats. Also, locations where such a sensor can be installed are limited. The magnetic load sensor unit 1 needs no seal structure for oil and fats.

The magnetic load sensor unit 1 has a directivity such that the output signal of the magnetic sensor 5 changes steeply and sharply when the relative position between the magnetic target 4 and the magnetic sensor 5 changes in the axial direction but does not change so steeply when this relative position changes in a direction other than the axial direction. Thus, the output signal of the magnetic sensor 5 is less likely to be influenced by external vibrations, so that it is possible to detect the magnitude of the axial load applied by the linear motion actuator 14 with high accuracy.

One way to detect the axial load applied by the linear motion actuator 14 is to estimate the axial load applied to the friction pad 22 based on the axial displacement of the outer ring member 25 when the friction pad 22 is axially pressed by the outer ring member 25. But for this purpose, a separate sensor is necessary to measure fluctuations in the home position of the outer ring member 25 due e.g. to wear of the friction pad 22. Such a sensor complicates the structure of the entire system. In contrast, since the magnetic load sensor unit 1 is configured to detect the axial load applied to the friction pad 22 based on the degree of deflection of the flange member 2 due to the reaction force when the friction pad 22 is pressed axially forward by the outer ring member 25, fluctuations in the home position of the outer ring member 25 due e.g. to wear of the friction pad 22 do not influence the axial load detected by the magnetic load sensor unit 1. Thus, no sensor is necessary to measure the home position of the outer ring member 25, so that the entire system is simpler in structure.

In the above embodiment, the linear motion mechanism for converting the rotation of the rotary shaft 23 to a linear motion of the linear motion member (the outer ring member 25 in this embodiment) is a planetary roller mechanism comprising the plurality of planetary rollers 24 kept in rolling contact with the cylindrical surface on the outer periphery of the rotary shaft 23, the carrier 26 supporting the planetary rollers 24 so as to be rotatable about their respective axes while revolving around the rotary shaft, and prevented from axial movement, and the outer ring member 25 surrounding the planetary rollers 24, in which the outer ring member 25 has the helical rib 34 engaged in the helical grooves or circumferential grooves 35 formed in the outer periphery of the respective planetary rollers 24. But the present invention is applicable to a linear motion actuator including a different linear motion mechanism too.

Figure 10:
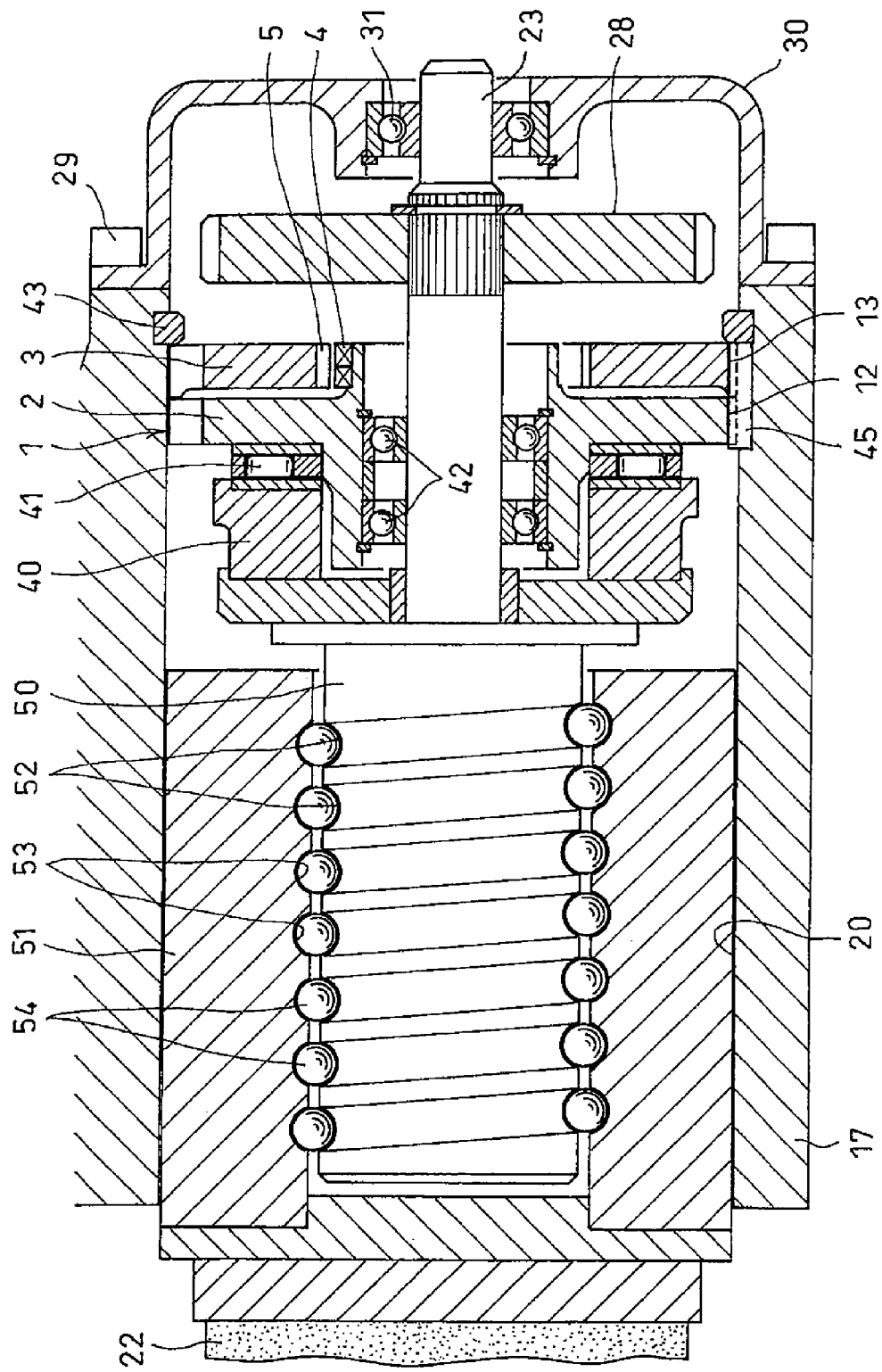
FIG. 10 is an enlarged sectional view of a linear motion actuator including a linear motion mechanism in the form of a ball-screw mechanism.

By way of example thereof, FIG. 10 shows a linear motion actuator including a ball-screw mechanism as the linear motion mechanism. In the following description of FIG. 10, elements corresponding to those of the above embodiment are denoted by identical numerals and their description is omitted.

In FIG. 10, the linear motion actuator comprises a rotary shaft 23, a threaded shaft 50 integral with the rotary shaft 23, a nut 51 surrounding the threaded shaft 50, a plurality of balls 54 disposed between a thread groove 52 formed in the outer periphery of the threaded shaft 50 and a thread groove 53 formed in the inner periphery of the nut 51, a return tube (not shown) through which the balls 54 are returned from the terminal end to the starting end, of the thread groove 53 of the nut 51, and the magnetic load sensor unit 1, which is provided axially rearward of the nut 51.

The nut 51 is received in the mounting hole 20 formed in the opposed piece 17 of the caliper body 19 so as to be rotationally fixed and axially slidable, relative to the caliper body 19. A spacer 40 is provided at the axially rear end of the threaded shaft 50 so as to rotate together with the threaded shaft 50. The spacer 40 is supported by the magnetic load sensor unit 1 through a thrust bearing 41. The magnetic load sensor unit 1 axially supports the nut 51 through the spacer 40, the thrust bearing 41 and the threaded shaft 50, thereby restricting axial rearward movement of the nut 51.

This linear motion actuator is configured such that when the rotary shaft 23 is rotated, the threaded shaft 50 and the nut 51 are rotated relative to each other such that the nut 51 is moved axially forward, thereby applying an axial load to the friction pad 22. At this time, an axial rearward reaction force is applied to the threaded shaft 50. The reaction force is transmitted to the magnetic load sensor unit 1 through the spacer 40 and the thrust bearing 41, and received by the sensor unit 1. The reaction force thus deflects the flange member 2 of the magnetic load sensor unit 1 axially rearward, changing the relative position between the magnetic target 4 and the magnetic sensor 5. This in turn changes the output signal of the magnetic sensor 5 corresponding to the magnitude of the axial load applied to the friction pad 22, in the same manner as in the first embodiment. Thus, it is possible to detect the pressing force applied to the friction pad 22 based on the output signal of the magnetic sensor 5.

Figure 11:
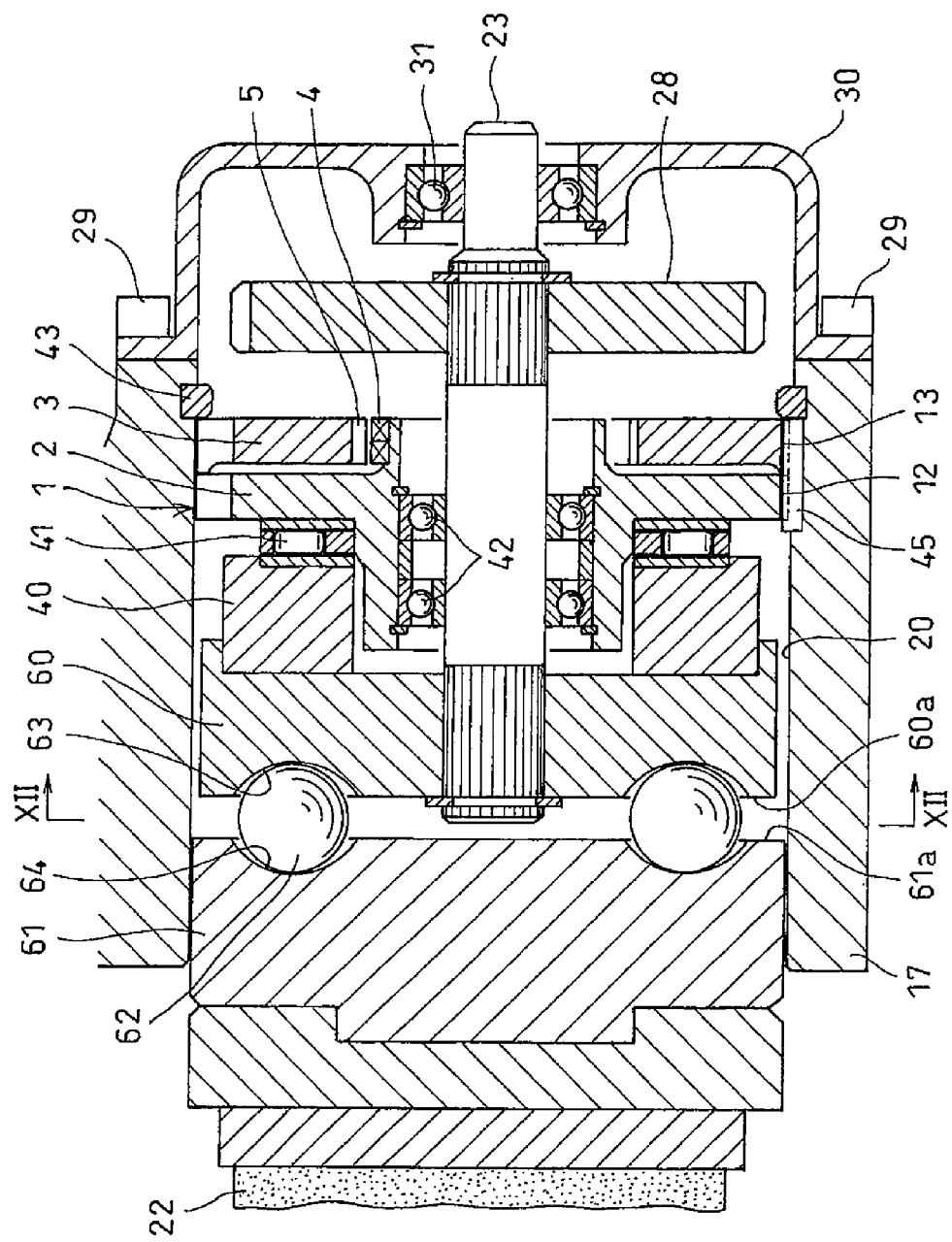
FIG. 11 is an enlarged sectional view of a linear motion actuator including a linear motion mechanism in the form of a ball-ramp mechanism.

FIG. 11 shows a linear motion actuator including a ball-ramp mechanism as the linear motion mechanism.

The linear motion actuator includes a rotary shaft 23, a rotary disk 60 rotationally fixed to the outer periphery of the rotary shaft 23, a linear motion disk 61 provided axially forward of the rotary disk 60 and facing the rotary disk 60, a plurality of balls 62 sandwiched between the rotary disk 60 and the linear motion disk 61, and the magnetic load sensor unit 1, which is provided axially rearward of the linear motion disk 61.

The linear motion disk 61 is received in the mounting hole 20 formed in the opposed piece 17 of the caliper body 19 so as to be rotationally fixed and axially slidable, relative to the caliper body 19. A spacer 40 is provided at the axially rear end of the rotary disk 60 so as to rotate together with the rotary disk 60. The spacer 40 is supported by the magnetic load sensor unit 1 through a thrust bearing 41. The magnetic load sensor unit 1 axially supports the rotary disk 60 through the spacer 40 and the thrust bearing 41, thereby restricting axial rearward movement of the rotary disk 60.

Figure 12:
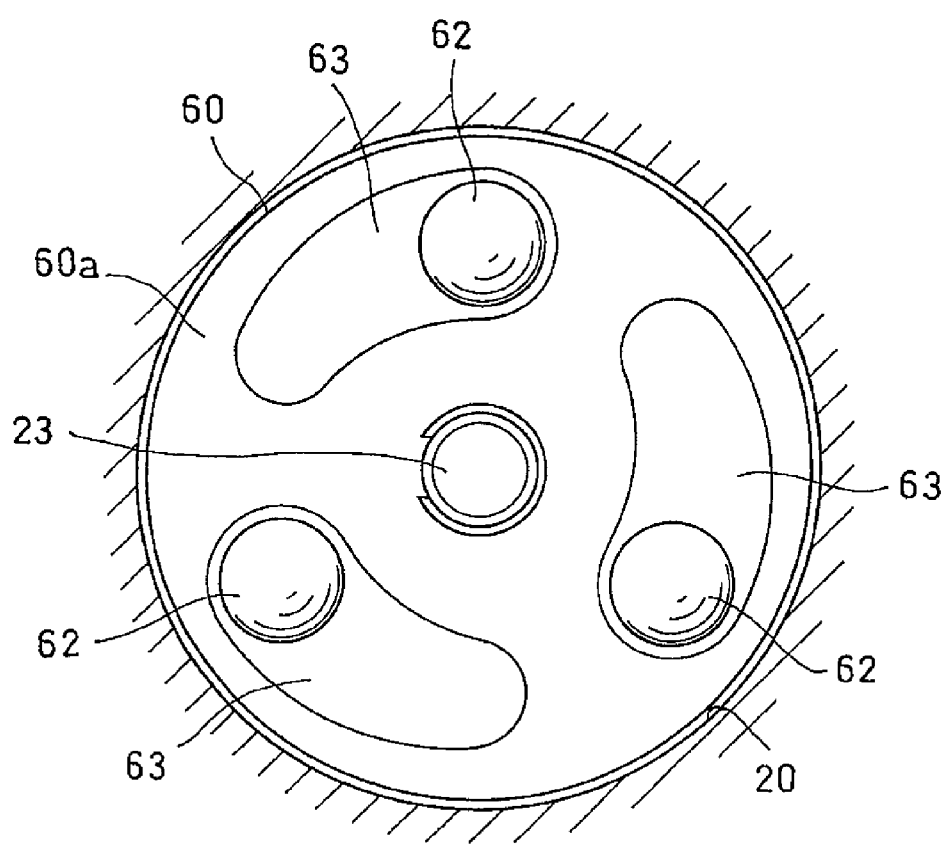
FIG. 12 is a sectional view taken along line XII-XII of FIG. 11.
Figure 13:
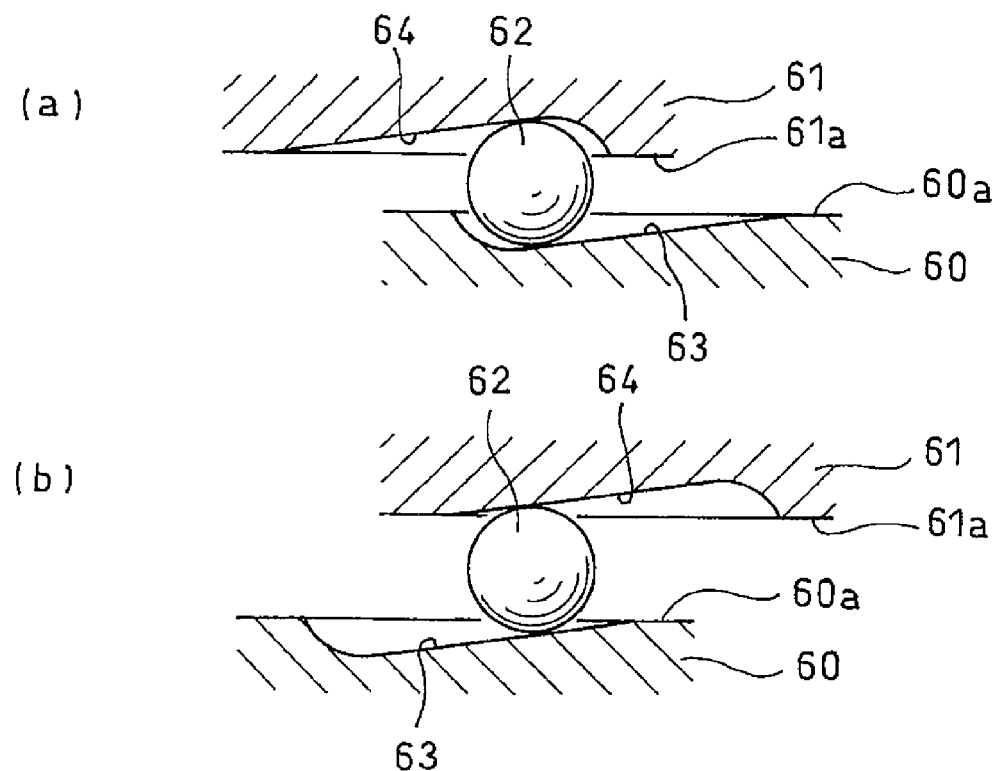
FIG. 13(a) shows the relationship between a ball and inclined grooves shown in FIG. 11.
FIG. 13(b) shows a state in which a rotary disk and a linear motion disk are rotated relative to each other, and the distance between the disks has increased, from the state of FIG. 13(a).

As shown in FIGS. 11 and 12, inclined grooves 63 are formed in the opposed surface 60a of the rotary disk 60 facing the linear motion disk 61 such that the depth of each inclined groove 63 gradually decreases in one of the opposite circumferential directions, while inclined grooves 64 are formed in the opposed surface 61a of the linear motion disk 61 facing the rotary disk 60 such that the depth of each inclined groove 64 gradually decreases in the other of the opposite circumferential directions. As shown in FIG. 13(a), the balls 62 are each received between the corresponding pair of the inclined grooves 63 of the rotary disk 60 and the inclined grooves 64 of the linear motion disk 61. As shown in FIG. 13(b), when the linear motion disk 61 rotates relative to the rotary disk 60, the balls 62 roll in the respective pairs of inclined grooves 63 and 64 such that the distance between the rotary disk 60 and the linear motion disk 61 increases.

This linear motion actuator is configured such that when the rotary shaft 23 is rotated, the linear motion disk 61 and the rotary disk 60 are rotated relative to each other such that the linear motion disk 61 is moved axially forward, thereby applying an axial load to the friction pad 22. At this time, an axial rearward reaction force is applied to the rotary disk 60. The reaction force is transmitted to the magnetic load sensor unit 1 through the spacer 40 and the thrust bearing 41, and received by the sensor unit 1. The reaction force thus deflects the flange member 2 of the magnetic load sensor unit 1 axially rearward, changing the relative position between the magnetic target 4 and the magnetic sensor 5. This in turn changes the output signal of the magnetic sensor 5 corresponding to the magnitude of the axial load applied to the friction pad 22, in the same manner as in the first embodiment. Thus, it is possible to detect the pressing force applied to the friction pad 22 based on the output signal of the magnetic sensor 5.

Further alternatively, the linear motion mechanism may comprises e.g. a magnetically levitated non-contact actuator or a voice coil motor.

Figure 14:
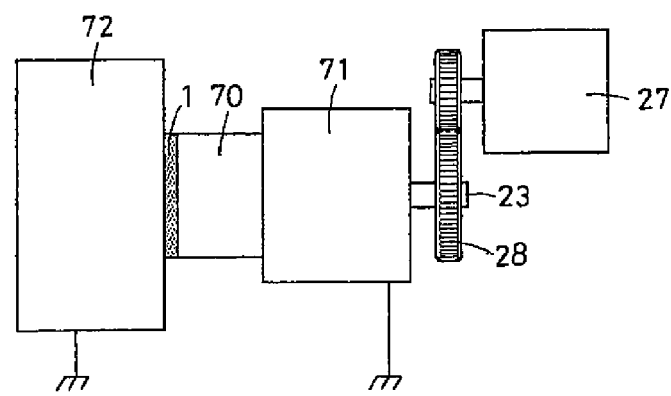
FIG. 14 schematically shows how the magnetic load sensor unit embodying the present invention is mounted in one example.

FIG. 14 shows a different linear motion actuator, which comprises a rotary shaft 23 to which the rotation of an electric motor 27 is transmitted, a linear motion member 70, a linear motion mechanism 71 for converting the rotation of the rotary. shaft 23 to axial movement of the linear motion member 70, thereby applying an axial load to an object 72, and the magnetic load sensor unit 1, in which the magnetic load sensor unit 1 is mounted between the linear motion member 70 and the object 72.

Figure 15:
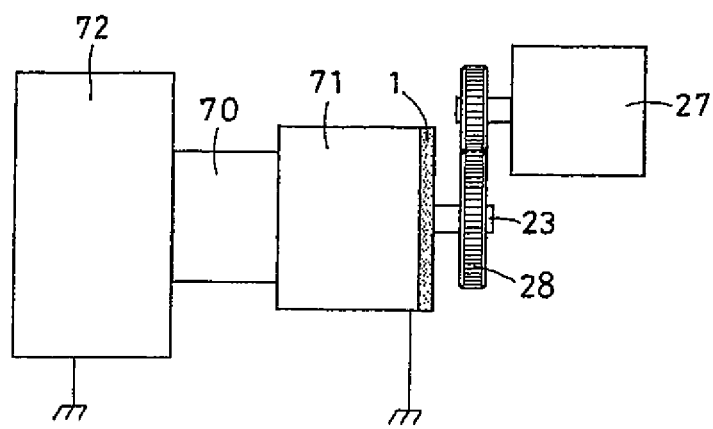
FIG. 15 schematically shows how the magnetic load sensor unit embodying the present invention is mounted in another example.

FIG. 15 shows a still different linear motion actuator, which comprises a rotary shaft 23 to which the rotation of an electric motor 27 is transmitted, a linear motion member 70, a linear motion mechanism 71 for converting the rotation of the rotary shaft 23 to axial movement of the linear motion member 70, thereby applying an axial load to an object 72, and the magnetic load sensor unit 1, in which the magnetic load sensor unit 1 supports the linear motion mechanism 71 from the rear of the linear motion mechanism 71.

Figure 16:
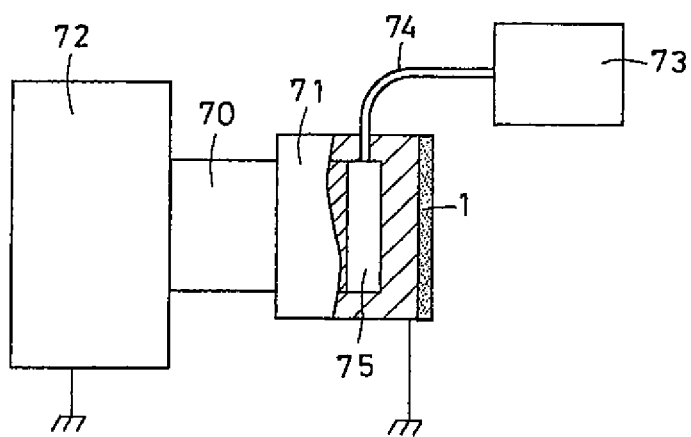
FIG. 16 schematically shows a different linear motion actuator in which the magnetic load sensor unit embodying the present invention is mounted.

FIG. 16 schematically shows a further different linear motion actuator, in which the linear motion mechanism 71 is driven not by the electric motor 27 but by a pressure generator 73 to linearly move the linear motion member 70. Driving force is transmitted from the pressure generator 73 to the linear motion mechanism 71 through a pressure medium, which may be oil or air. By adjusting the pressure in a sealed chamber 75 through a pipe 74, the linear motion member 70 is moved in the axial direction. In FIG. 16, the magnetic load sensor unit 1 supports the linear motion mechanism 71 from the rear of the linear motion mechanism 71. But instead, the magnetic load sensor unit 1 may be mounted between the linear motion member 70 and the object 72, as in the embodiment of FIG. 14.

In any of the above embodiments, the magnetic load sensor unit 1 is used to detect an axial compressive load. But the sensor unit 1 may be used to detect an axial tensile load. The output of the magnetic sensor 5 may be in the form of a voltage output, any other analogue output such as a current output, or a digital output based on a predetermined protocol such as a PWM duty ratio or serial-parallel communication.

Figure 17:
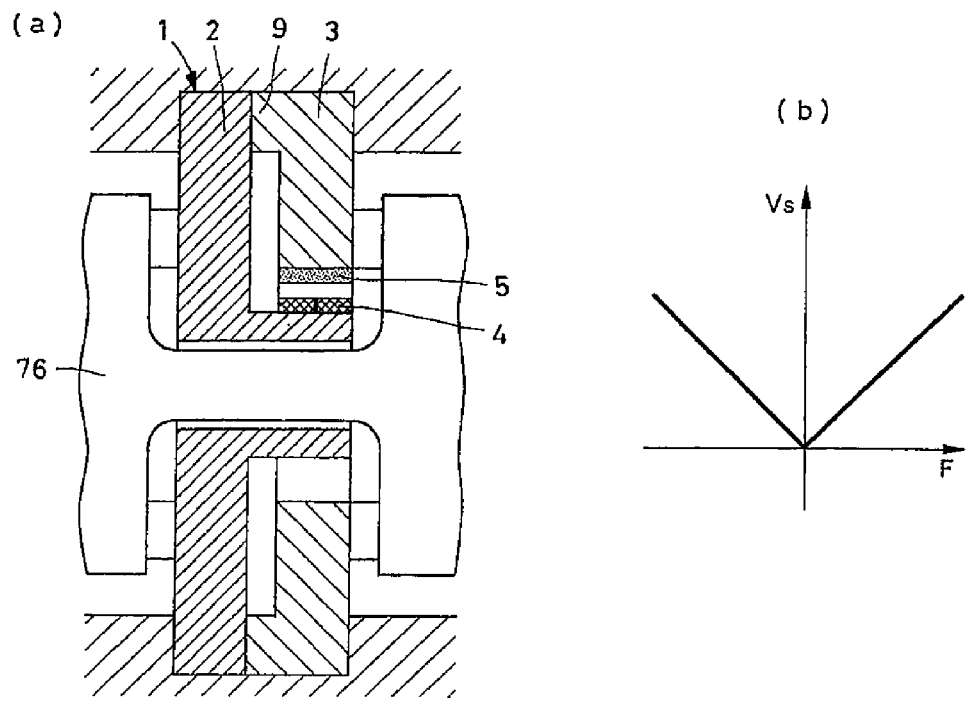
FIG. 17(a) schematically shows how both compressive and tensile axial loads are detected with the magnetic load sensor unit embodying the invention.
FIG. 17(b) shows the relationship between the above two axial loads and the output of the magnetic sensor.

FIGS. 17(a) and 17(b) show how a single magnetic sensor 5 detects the intensities of both a compressive axial load and a tensile axial load which are selectively generated by a linear motion actuator. With the flange member 2 and the support member 3 both fixed in position at the respective outer peripheral portions, the flange member 2 and the support member 3 are restrained from both axial sides by a member 76 to which a load applied by the linear motion actuator is applied. When the load applied by the linear motion actuator is reversed in direction, the direction in which the relative position between the magnetic target and the magnetic sensor 5 changes remains unchanged.

Figure 18:
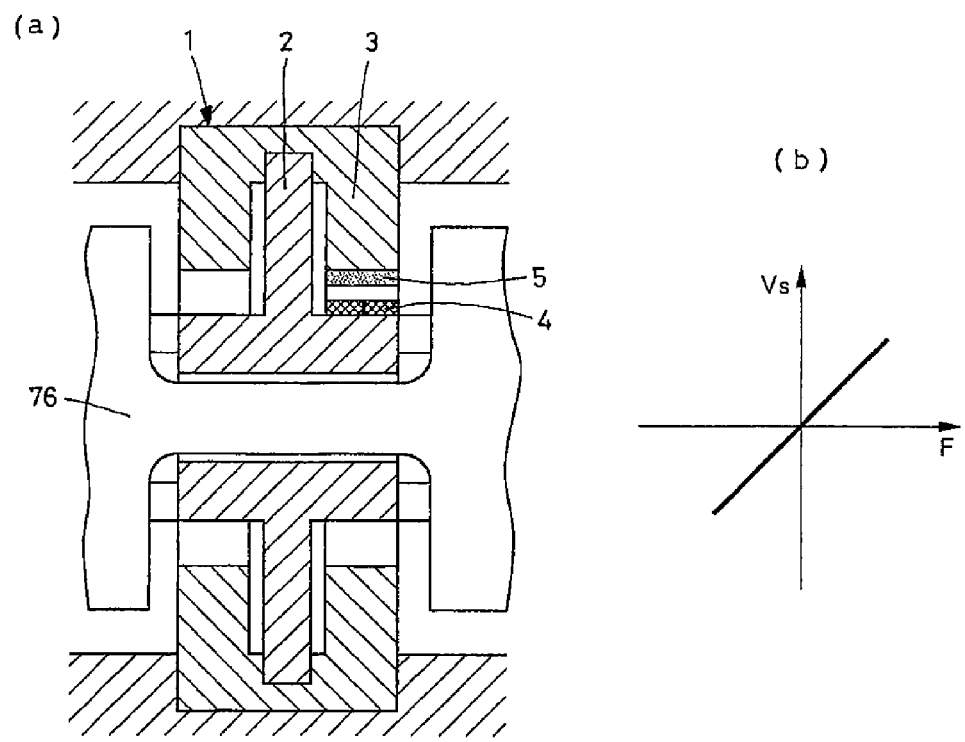
FIG. 18(a) schematically shows how both compressive and tensile axial loads are detected with the magnetic load sensor unit embodying the invention in a different arrangement.
FIG. 18(b) shows the relationship between the two axial loads detected in the arrangement of FIG. 18(a) and the output of the magnetic sensor.

FIGS. 18(a) and 18(b) show how a single magnetic sensor 5 detects not only the intensities but the directions of a compressive axial load and a tensile axial load which are selectively generated by a linear motion actuator. With the flange member 2 and the support member 3 both fixed in position at the respective outer peripheral portions, the flange member 2 is restrained from both axial sides by a member 76 to which a load applied by the linear motion actuator is applied. When the load applied by the linear motion actuator is reversed in direction, the direction in which the relative position between the magnetic target 4 and the magnetic sensor 5 changes is also reversed. Thus, this sensor unit 1 can detect not only the magnitude of the axial load applied, but also its direction.

Figure 19:
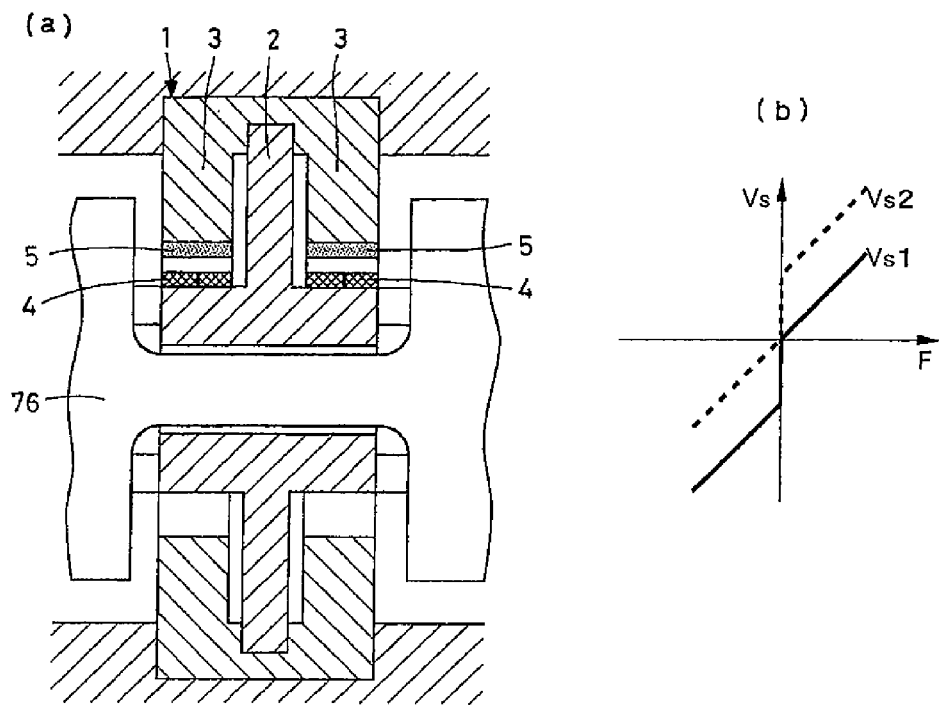
FIG. 19(a) schematically shows how both compressive and tensile axial loads are detected with the magnetic load sensor unit embodying the invention in a still different arrangement.
FIG. 19(b) shows the relationship between the two axial loads detected in the arrangement of FIG. 19(a) and the output of the magnetic sensor.

In the embodiment of FIGS. 18(a) and 18(b), when the load applied is reversed in direction, since the point to which the load is applied changes, the relationship between the load applied and the sensor output may become nonlinear. As shown in FIG. 19, in order to cope with this problem, two sets of the magnetic targets 4 and the magnetic sensors 5 may be used, with one of the two sets located near the point where a compressive load is applied and the other near the point where a tensile load is applied, to detect the tensile load with one of the magnetic sensors and the compressive load with the other of the magnetic sensors. With this arrangement, it is possible to estimate the linear relationship between the load applied and the sensor output. Otherwise, an algorism may be used to correct nonlinearity between the load applied and the output of a single sensor when the load applied is reversed in direction.

Figure 20:
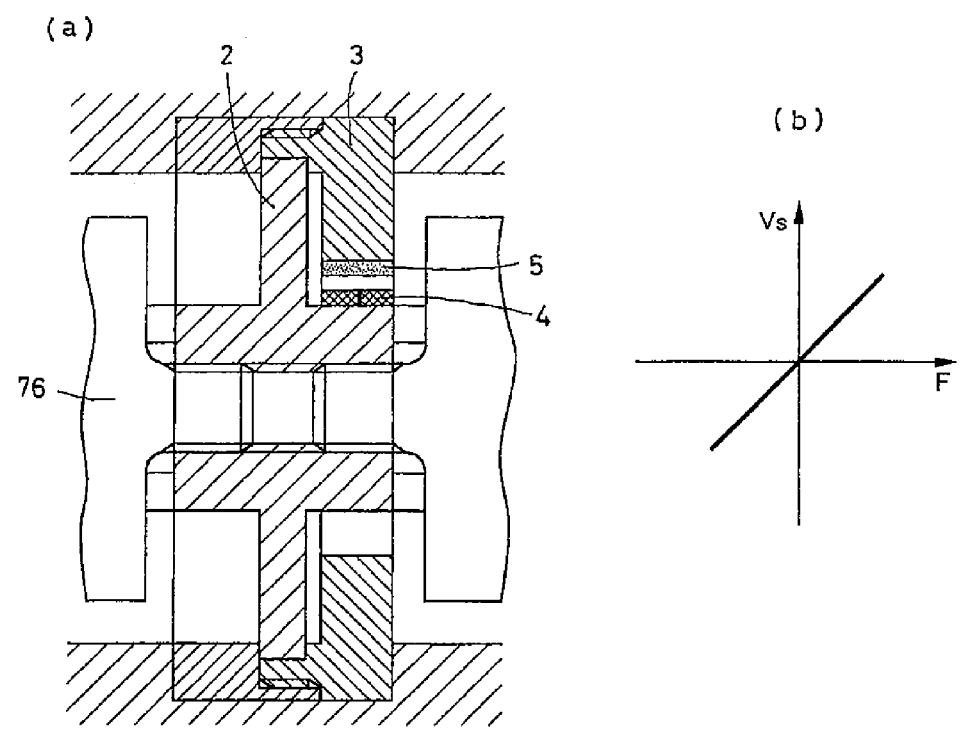
FIG. 20(a) schematically shows how both compressive and tensile axial loads are detected with the magnetic load sensor unit embodying the invention in a further different arrangement.
FIG. 20(b) shows the relationship between the two axial loads detected in the arrangement of FIG. 20(a) and the output of the magnetic sensor.

In the embodiment of FIG. 20, a static preload is applied to the flange member 2 and the support member 3 by bringing them into threaded engagement with each other at the outer peripheral portions, to eliminate a gap therebetween, and thus prevent nonlinearity between the load applied and the sensor output. Instead of threaded engagement between the flange member and the support member, the flange member and the support member may be coupled together by crimping or by press-fitting one into the other to eliminate a gap therebetween. For the same purpose, the flange member and the support member may be made of a sufficiently hard spring material, or may be formed so as to be integral with each other.

Figure 21:
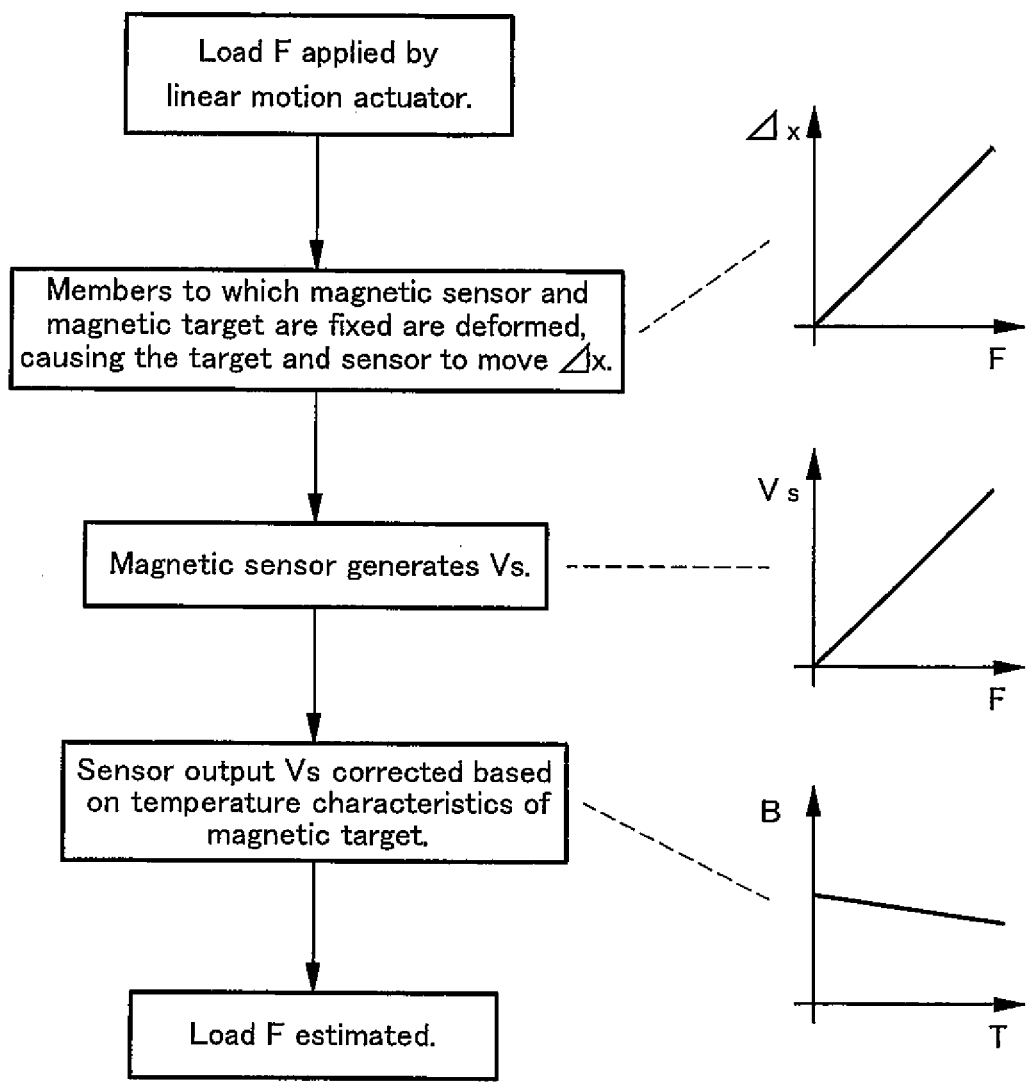
FIG. 21 is a flow chart of a method for estimating the magnitude of an axial load applied by the linear motion actuator from the output signal of the magnetic sensor.

FIG. 21 shows a method of estimating the load applied by the linear motion actuator from the output signal of the magnetic sensor 5. When a load F is applied by the linear motion actuator, the relative position between the magnetic target 4 and the magnetic sensor 5 changes, which in turn changes the output signal of the magnetic sensor 5. By compensating for the temperature-dependent magnetic properties of the magnetic target 4, it is possible to estimate the load applied independently of the temperature. In order to compensate for the temperature influence, a magnetic sensor 5 having a built-in temperature compensation function, such as a Hall IC, may be used to estimate the load applied by the linear motion actuator from the output of such a magnetic sensor 5.

In any of the above embodiments, in order to detect the distance by which the relative position between magnetic target 4 and the magnetic sensor 5 change with high accuracy, the magnets of the magnetic target 4 are arranged such that the direction of magnetization of each magnet is perpendicular to the direction in which magnetic target 4 and the magnetic sensor 5 move relative to each other. In another possible arrangement, a magnet of the magnetic target 4 is arranged such that the direction of magnetization of the magnet is parallel to the direction in which the magnetic target and the magnetic sensor move relative to each other, and the magnetic sensor 5 is positioned so as to face the magnetic target 4 in the direction in which the magnetic target 4 and the magnetic sensor 5 move relative to each other.

In any of the above embodiments, the radially outer portion of the flange member 2 is supported by the support member 3 so that the radially inner portion of the flange member 2 is deflected by an axial load. But conversely, the flange member 2 may be supported at the radially inner portion by the support member 3 so that the flange member 2 is deflected at the radially outer portion by an axial load.

DESCRIPTION OF THE NUMERALS

1. Magnetic load sensor unit
2. Flange member
3. Support member
4. Magnetic target
5. Magnetic sensor
6. Tubular portion
9. Annular protrusion
11. Permanent magnet
12, 13. Positioning groove
14. Linear motion actuator
22. Friction pad
23. Rotary shaft
27. Electric motor
70. Linear motion member
71. Linear motion mechanism
72. Object

What is claimed is:

1. A magnetic load sensor unit for use in a linear motion actuator, the magnetic load sensor unit being configured to detect an magnitude of an axial load applied to an object by the linear motion actuator, and comprising:
    a flange member annularly shaped so that a rotary shaft can extend through the flange member, and configured to be deflected when the axial load is applied;
    a support member annularly shaped so that the rotary shaft can extend through the support member, and supporting a radially inner portion or a radially outer portion of the flange member;
    a magnetic target which generates a magnetic field, the magnetic target being fixed to one of the flange member and the support member; and
    a magnetic sensor fixed to the other of the flange member and the support member, and configured such that a position of the magnetic sensor relative to the magnetic target changes in an axial direction corresponding to the axial load, the magnetic sensor being configured to detect the axial load based on a relative displacement between the magnetic target and the magnetic sensor in the axial direction, wherein the magnetic target includes an S-pole and an N-pole that are arranged adjacent to each other in the axial direction.

2. The magnetic load sensor unit of claim 1, wherein the magnetic target comprises at least two permanent magnets each magnetized in a direction perpendicular to a relative movement direction in which the position of the magnetic sensor relative to the magnetic target changes, wherein the permanent magnets are arranged such that opposite magnetic poles of the permanent magnets are aligned in the relative movement direction, and wherein the magnetic sensor is located in a vicinity of a boundary between the opposite magnetic poles.

3. The magnetic load sensor unit of claim 1, wherein the flange member and the support member are annular plate members, wherein one of the flange member and the support member includes a tubular portion having a radially outer surface facing a radially inner surface of the other of the flange member and the support member, and wherein the magnetic target and the magnetic sensor are fixed to one and the other of the radially inner surface and the radially outer surface, respectively.

4. The magnetic load sensor unit of claim 1, wherein positioning means are provided at respective outer peripheral portions of the flange member and the support member, for determining a circumferential relative position between the flange member and the support member.

5. The magnetic load sensor unit of claim 1, wherein the magnetic sensor comprises an IC element.

6. The magnetic load sensor unit of claim 5, wherein the IC element comprises a Hall IC.

7. The magnetic load sensor unit of claim 1, wherein the magnetic sensor comprises a magnetic resistance element.

8. The magnetic load sensor unit of claim 1, wherein the magnetic sensor comprises a magnetic impedance element.

9. The magnetic load sensor unit of claim 1, wherein the magnetic target comprises neodymium magnets.

10. A linear motion actuator comprising a rotary shaft to which a rotation of an electric motor is to be transmitted, a linear motion member, a linear motion mechanism for converting a rotation of the rotary shaft to an axial movement of the linear motion member, thereby applying an axial load to an object, and a reaction force receiving member which receives a reaction force that acts on the linear motion mechanism when the axial load is applied to the object, wherein the reaction force receiving member comprises the magnetic load sensor unit of claim 1.

11. The linear motion actuator of claim 10, wherein feedback control is performed on the axial load based on an output signal of the magnetic sensor.

12. A linear motion actuator comprising a rotary shaft to which a rotation of an electric motor is to be transmitted, a linear motion member, a linear motion mechanism for converting a rotation of the rotary shaft to an axial movement of the linear motion member, thereby applying an axial load to an object, and the magnetic load sensor unit of claim 1, wherein the magnetic load sensor unit is mounted between the linear motion member and the object.

13. The linear motion actuator of claim 12, wherein feedback control is performed on the axial load based on an output signal of the magnetic sensor.

14. The magnetic load sensor unit of claim 1, wherein the support member supports the flange member, and includes an annular protrusion on a surface of the support member facing the flange member, such that the annular protrusion (i) keeps the flange member spaced apart from a body of the support member, and (ii) allows for a portion of the flange member to be deflected when the axial load is applied.

* * * * *